United States Patent
Kuroda et al.

(10) Patent No.: US 9,794,520 B2
(45) Date of Patent: Oct. 17, 2017

(54) IMAGE CAPTURE DEVICE AND METHOD FOR RECOGNIZING IRRADIATED POSITION MARK ON OBJECT

(75) Inventors: Kazuo Kuroda, Yokohama (JP); Ayako Yoshida, Kawasaki (JP)

(73) Assignee: PIONEER CORPORATION, Kawasaki-Shi, Kanagawa (JP)

( * ) Notice: Subject to any disclaimer, the term of this patent is extended or adjusted under 35 U.S.C. 154(b) by 214 days.

(21) Appl. No.: 14/425,275

(22) PCT Filed: Sep. 5, 2012

(86) PCT No.: PCT/JP2012/072591
§ 371 (c)(1), (2), (4) Date: Mar. 2, 2015

(87) PCT Pub. No.: WO2014/038007
PCT Pub. Date: Mar. 13, 2014

(65) Prior Publication Data
US 2015/0222857 A1    Aug. 6, 2015

(51) Int. Cl.
*H04N 5/253* (2006.01)
*H04N 7/18* (2006.01)
(Continued)

(52) U.S. Cl.
CPC ............... *H04N 7/18* (2013.01); *G06K 9/18* (2013.01); *G06K 9/2018* (2013.01);
(Continued)

(58) Field of Classification Search
CPC ...................................................... H04N 7/18
(Continued)

(56) References Cited

U.S. PATENT DOCUMENTS

| | | | |
|---|---|---|---|
| 6,917,720 B1* | 7/2005 | Caesar | G06K 9/3216 382/165 |
| 8,368,781 B2 | 2/2013 | Hine et al. | |
| 2005/0040298 A1* | 2/2005 | Ohki | F16M 11/10 248/176.1 |
| 2009/0086199 A1* | 4/2009 | Troy | G01C 1/04 356/251 |
| 2011/0234758 A1* | 9/2011 | Tsuboi | H04N 13/0253 348/46 |

(Continued)

FOREIGN PATENT DOCUMENTS

| | | |
|---|---|---|
| JP | 09-130780 A | 5/1997 |
| JP | 2002-262180 A | 9/2002 |

(Continued)

OTHER PUBLICATIONS

Office Action for JP App No. 2014-534076 dated Jun. 7, 2016, 6 pgs.

(Continued)

*Primary Examiner* — Richard Torrente
(74) *Attorney, Agent, or Firm* — Procopio, Cory, Hargreaves & Savitch LLP

(57) ABSTRACT

A mark irradiation unit (130) irradiates an object with a mark. An image capture unit (140) captures an image of the object, and generates image data. Then, an image capture area data generation unit recognizes a position of the mark in the object, and cuts out image capture area data which is apart of the image data on the basis of the mark. For this reason, the mark irradiation unit (130) irradiates the object with the mark, and thus even when a positioning symbol is not printed on the object to be stored as the image data, only a necessary portion in the image data is cut out.

9 Claims, 16 Drawing Sheets

(51) Int. Cl.
- *H04N 5/232* (2006.01)
- *G06K 9/18* (2006.01)
- *G11B 25/04* (2006.01)
- *H04N 5/225* (2006.01)
- *H04N 5/235* (2006.01)
- *H04N 5/357* (2011.01)
- *G06K 9/20* (2006.01)
- *G06K 9/32* (2006.01)
- *H04N 1/195* (2006.01)

(52) U.S. Cl.
CPC ............ *G06K 9/3216* (2013.01); *G11B 25/04* (2013.01); *H04N 1/19594* (2013.01); *H04N 5/2251* (2013.01); *H04N 5/2252* (2013.01); *H04N 5/2256* (2013.01); *H04N 5/2354* (2013.01); *H04N 5/23296* (2013.01); *H04N 5/357* (2013.01); *H04N 2201/00* (2013.01)

(58) Field of Classification Search
USPC ........................................................ 348/107
See application file for complete search history.

(56) References Cited

U.S. PATENT DOCUMENTS

2011/0242392 A1* 10/2011 Chiang ............... H04M 1/0272
348/333.1

FOREIGN PATENT DOCUMENTS

| JP | 2004-023359 A | 1/2004 |
|---|---|---|
| JP | 2004-030589 A | 1/2004 |
| JP | 2005-099708 A | 4/2005 |
| JP | 2006-134303 A | 5/2006 |
| JP | 2007-110239 A | 4/2007 |
| JP | 2007-180802 A | 7/2007 |
| JP | 2009-206577 A | 9/2009 |
| JP | 2012-068746 A | 4/2012 |

OTHER PUBLICATIONS

International Search Report for PCT/JP2012/072591, dated Sep. 26, 2012.

* cited by examiner

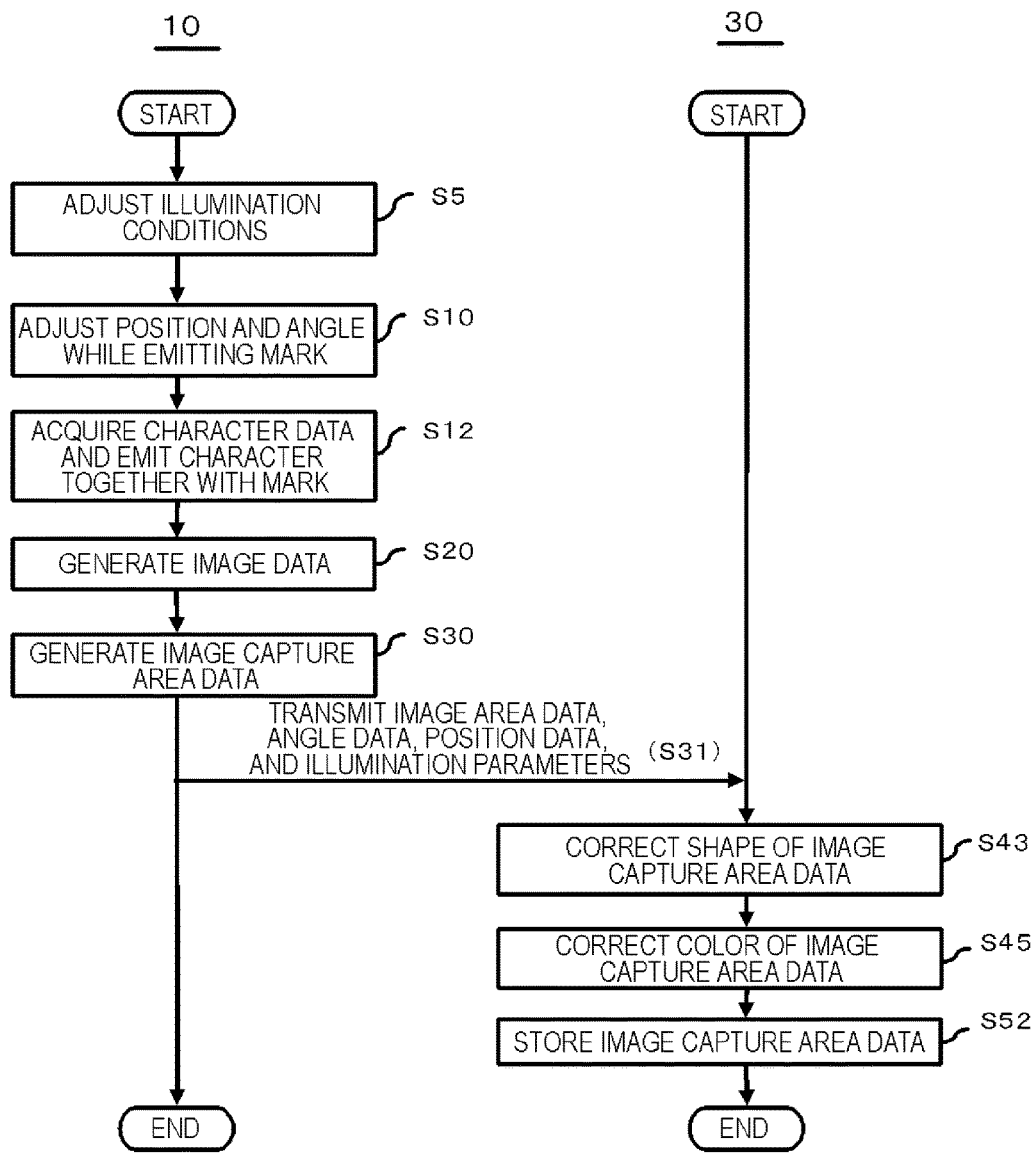

US 9,794,520 B2

IMAGE CAPTURE DEVICE AND METHOD FOR RECOGNIZING IRRADIATED POSITION MARK ON OBJECT

TECHNICAL FIELD

The present invention relates to an image capture device and an image processing method.

BACKGROUND ART

As a medium for data, paper has generally been used. On the other hand, recently, as a medium for data, electronic data has become widespread. For this reason, there are an increasing number of occasions for data printed on paper to be stored as image data.

As a technology for storing data printed on paper as image data, for example, there is a technology disclosed in Patent Document 1. In this technology, a positioning symbol is printed on rectangular paper, and a region to be stored is cut out from image capture data which is obtained by capturing an image of the paper on the basis of the positioning symbol. Further, in Patent Document 1, trapezoid correction is performed with respect to the cut-out region.

RELATED DOCUMENT

Patent Document

[Patent Document 1] Japanese Laid-open patent publication No. 2012-068746

DISCLOSURE OF THE INVENTION

According to the technology disclosed in Patent Document 1, only a necessary portion in the image data is able to be cut out and stored. However, in the technology disclosed in Patent Document 1, it is necessary that the positioning symbol is printed on an object (for example, paper) to be processed in advance. For this reason, it is not possible to computerize only a necessary portion in data printed on an object on which a positioning symbol is not printed.

An example of an object of the present invention is to cut out only a necessary portion in image data even when a positioning symbol is not printed on an object to be stored as image data.

The invention according to an example embodiment is an image capture device including a mark irradiation unit which irradiates an object with a mark; an image capture unit which captures an image of the object and generates image data; and an image capture area data generation unit which recognizes a position of the mark in the image data, and cuts out image capture area data which is a part of the image data on the basis of the position.

The invention according to another example emobidment is an image processing method including capturing an image of an object and generating image data in a state in which the object is irradiated with a mark; and recognizing a position of the mark in the image data and cutting out image capture area data which is a part of the image data on the basis of the mark by using a computer.

BRIEF DESCRIPTION OF THE DRAWINGS

The above-described object and other objects, characteristics, and advantages will be made more obvious by preferred embodiments described below and the accompanying drawings.

FIG. 16 is a flowchart for describing a second example of the processing performed by the image processing device.

DESCRIPTION OF EMBODIMENTS

Figure 1:
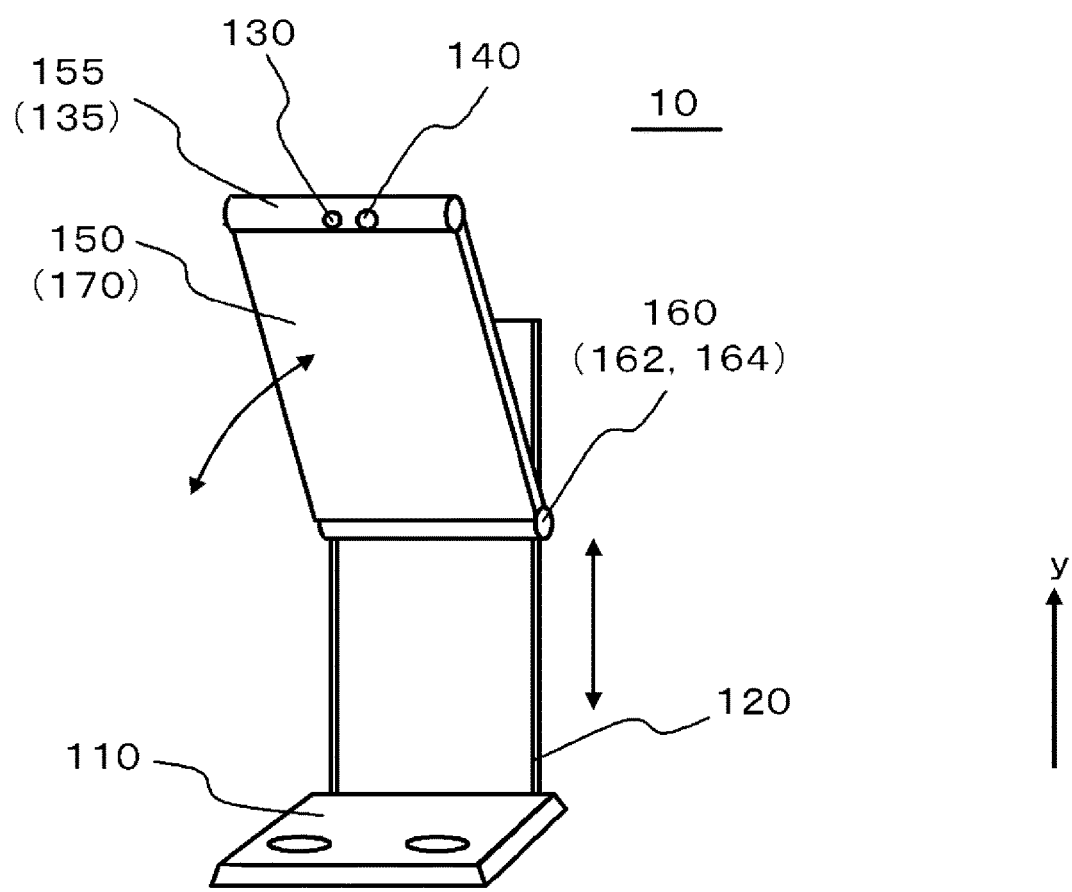
FIG. 1 is a perspective view illustrating a configuration of an image capture device according to a first embodiment.

Hereinafter, embodiments of the present invention will be described with reference to the drawings. Furthermore, in all the drawings, the same reference numerals are applied to the same constituents, and the description thereof will not be repeated.

(First Embodiment)

Figure 2:
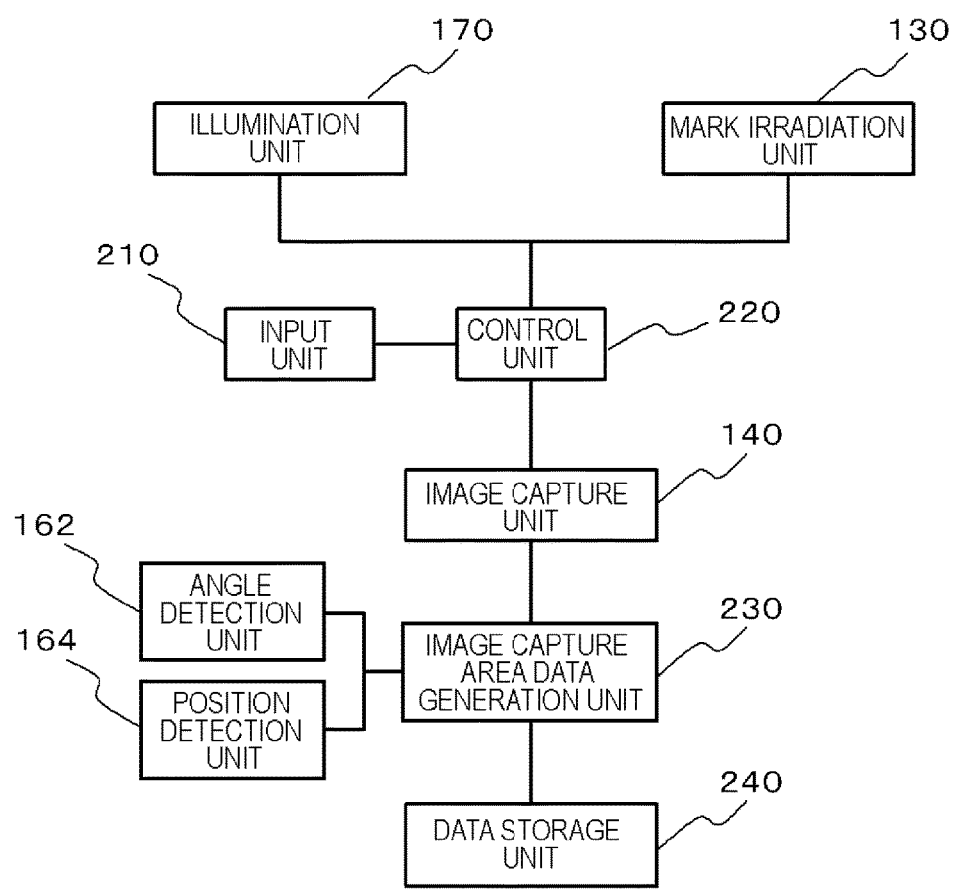
FIG. 2 is a block diagram illustrating a functional configuration of the image capture device.

FIG. 1 is a perspective view illustrating a configuration of an image capture device 10 according to a first embodiment. FIG. 2 is a block diagram illustrating a functional configuration of the image capture device 10. The image capture device 10 includes a mark irradiation unit 130, an image capture unit 140, and an image capture area data generation unit 230 (illustrated in FIG. 2). The mark irradiation unit 130 irradiates an object with a mark. The object is a sheet-like material, for example, paper on which data is printed, but may be other materials, for example, a commercial product for display. The image capture unit 140 captures an image of the object and generates image data. The image capture area data generation unit 230 recognizes the mark in the image data, and cuts out image capture area data which is a part of the image data on the basis of the mark. According to this embodiment, the mark irradiation unit 130 irradiates the object with the mark, and thus even when a positioning symbol is not printed on the object to be stored as the image data, only a necessary portion in the image data is cut out. Hereinafter, the details will be described.

First, a structural configuration of the image capture device 10 will be described with reference to FIG. 1. As illustrated in FIG. 1, the mark irradiation unit 130 and the image capture unit 140 are embedded in an edge portion 155 of a holding member 150. The edge portion 155 is rotatably attached to the holding member 150. A direction of the edge portion 155 when based on the holding member 150, that is, an angle of the edge portion 155 with respect to the holding member 150 is detected by a position angle detection unit 135.

The holding member 150 further holds an illumination unit 170. The illumination unit 170 illuminates the object, and brightens an image shown by image capture data. One end of the holding member 150 is attached to a guide member 120 through an attachment portion 160. Furthermore, the edge portion 155 is attached to the other end side of the holding member 150, that is, a side of the holding member 150 opposite to the attachment portion 160 across the illumination unit 170.

The illumination unit 170, for example, includes an organic electroluminescence (EL) panel as a light source. The organic EL panel includes a plurality of types of organic EL having spectral properties different from each other. The organic EL element, for example, emits colors of light different from each other. A combination of colors of the light emitted by the illumination unit 170 is arbitrary, and RGB (red, green, and blue), or RYB (red, yellow, and blue) is included as an example. Intensity of the plurality of colors is controlled by a control unit 220 illustrated in FIG. 2. For this reason, a user of the image capture device 10 is able to adjust illumination light of the object to have a desired color. In particular, when the illumination unit 170 includes the organic EL element, it is possible to make a spectrum of the light emitted by the illumination unit 170 broad. In this case, it is possible for the light of the illumination unit 170 to feel like soft natural light to an observer. Furthermore, the light source of the illumination unit 170 is not limited to the organic EL panel, and for example, may be a light emitting diode (LED).

The illumination unit 170 may include a plurality of organic EL panels. In this case, the plurality of organic EL panels may emit light having colors identical to each other (including a combination of a plurality of colors). In addition, at least one organic EL panel may include an organic EL element emitting light having a color different from those of other organic EL panels. In addition, at least one organic EL panel may have a spectral width different from those of the other organic EL panels. In this case, the illumination unit 170 may switch between organic EL panels emitting the light.

In this embodiment, a planar shape of the holding member 150 is a rectangle. The attachment portion 160 attaches a side of the holding member 150 to the guide member 120. Further, the attachment portion 160 rotatably attaches the holding member 150 to the guide member 120 with the attachment portion 160 as a pivot point. The mark irradiation unit 130 and the image capture unit 140 are attached to a side of the holding member 150 opposite to the side which is attached to the guide member 120.

The guide member 120 is attached to a pedestal 110, and extends upward from the pedestal 110. The holding member 150 is attached to the guide member 120 such that the holding member 150 is able to be moved in a vertical direction along the guide member 120. In the attachment portion 160, a stopper is embedded. The stopper is disposed to fix a position of the holding member 150 in the vertical direction and to fix an angle of the attachment portion 160. For this reason, the user of the image capture device 10 moves the holding member 150 to a desired height, and rotates the holding member 150 to a desired angle, and then is able to fix the height and the angle.

Further in the attachment portion 160, an angle detection unit 162 and a position detection unit 164 are embedded.

The angle detection unit 162 detects a direction of the holding member 150 when based on the guide member 120, that is, an angle of the holding member 150 with respect to the guide member 120. The pedestal 110 is disposed in a place (for example, on a desk) identical to that of the object (for example, the paper on which the data is printed) of the processing. In addition, an angle of the guide member 120 with respect to the pedestal 110 is fixed (for example, 90 degrees). For this reason, the image capture device 10 is able to calculate an angle of the mark irradiation unit 130 and the image capture unit 140 with respect to a surface of the object to which the mark is applied on the basis of a detection result of the angle detection unit 162.

The position detection unit 164 detects a position of the attachment portion 160 in a direction along the guide member 120. The guide member 120 is fixed to the pedestal 110. For this reason, the image capture area data generation unit 230 (illustrated in FIG. 2) is able to calculate a distance (or a height) of the mark irradiation unit 130 and the image capture unit 140 with respect to the object on the basis of a detection result of the position detection unit 164.

In the pedestal 110, an electronic component for controlling is embedded. A control system of the image capture device 10 is configured by the electronic component.

Furthermore, the mark irradiation unit 130 is controlled such that the center of an image capture area shown by the mark is coincident with the center of an image capture area of the image capture unit 140. In addition, the center of an illumination region of the illumination unit 170 is coincident with these centers.

Next, a function of the image capture device 10 will be described with reference to FIG. 2. The image capture device 10 includes an input unit 210, the control unit 220, the image capture area data generation unit 230, and a data storage unit 240 in addition to the image capture unit 140, the angle detection unit 162, the position detection unit 164, and the illumination unit 170.

The input unit 210 acquires input information from the user of the image capture device 10. The input information, for example, is information indicating the image capture area shown by the mark of the mark irradiation unit 130, information indicating an intensity and a color hue of the light of the illumination unit 170, and information indicating a generation timing of the image data of the image capture unit 140. The control unit 220 controls the mark irradiation unit 130, the image capture unit 140, and the illumination unit 170 according to the information input from the input unit 210.

In this embodiment, the image capture area data generation unit 230 recognizes the mark in the image data by the image processing, and cuts out the image capture area data on the basis of the mark. For this reason, it is possible to cut out the image capture area data with high accuracy. In addition, the image capture area data generation unit 230 corrects a distortion of the image capture area data on the basis of the detection result of the angle detection unit 162 and the position detection unit 164. The correction, for example, is processing referred to as trapezoid correction.

The image capture area data generation unit 230 performs the trapezoid correction with respect to the image capture area data on the basis of a position (an example illustrated in FIG. 6 (b) described later) or a shape (an example illustrated in FIG. 5 or FIG. 6(a) described later) of the mark in the image data generated by the image capture unit 140.

Specifically, the mark irradiation unit 130 draws the mark such that the image capture area has a shape determined in advance, for example, a square or a rectangle. Then, the image capture area data generation unit 230 performs the trapezoid correction with respect to the image capture area data such that a shape shown by the image capture area data is the above-described shape determined in advance (for example, a square or a rectangle). Accordingly, when the image capture area data is displayed, displayed information is easily viewed.

Furthermore, the control unit 220 changes an irradiation angle of the mark emitted by the mark irradiation unit 130 on the basis of the detection result of the angle detection unit 162, the position detection unit 164, and the position angle detection unit 135, and thus the mark shows a desired image capture area (for example, a square or a rectangle) on the object. This processing will be described later in detail.

In addition, both of the mark irradiation unit 130 and the image capture unit 140 have optical systems such as a lens. These optical systems necessarily have individual differences. For this reason, the image capture area data has a distortion due to these individual differences.

In contrast, in this embodiment, the image capture area data generation unit 230 stores correction parameters for correcting the distortion of the image capture area data due to an individual difference of at least one of the image capture unit 140 and the mark irradiation unit 130 in advance. Then, the image capture area data generation unit 230 corrects the image capture area data by using the correction parameters. The correction parameters, for example, are generated as follows.

First, the position and the angle of the holding member 150 and the angle of the edge portion 155 in the image capture device 10 are adjusted such that detection values of the angle detection unit 162, the position detection unit 164, and the position angle detection unit 135 are values determined in advance. Subsequently, the image capture unit 140 captures an image of the object having a shape determined in advance (for example, a sheet on which the mark determined in advance is printed) and generates the image capture data. The image capture area data generation unit 230 sets the correction parameters such that the shape of the object shown by the image capture data (or a shape of an area defined by the mark) is a shape determined in advance. When the correction parameters obtained by this method are used, the image capture area data generation unit 230 is able to correct the distortion of the image capture area data due to the individual differences of both of the mark irradiation unit 130 and the image capture unit 140. Furthermore, the correction parameters are able to be generated at an arbitrary timing.

The data storage unit 240 stores the image capture area data after being corrected by the image capture area data generation unit 230. The data storage unit 240 may be a volatile memory or a nonvolatile memory, and may be a hard disk. The data storage unit 240 may be an external storage device (for example, an external hard disk, an external nonvolatile memory, or the like) of the image capture device 10, and may be embedded in the pedestal 110 of the image capture device 10.

In addition, when the illumination unit 170 emits light having a plurality of colors, and the intensities of the plurality of colors are able to be controlled independently of each other, the image capture area data generation unit 230 acquires illumination parameters indicating each intensity of the plurality of colors of the light emitted by the illumination unit 170 from the control unit 220. Then, the image capture area data generation unit 230 performs color correction with respect to the image capture area data by using the acquired illumination parameters. Accordingly, a color of the object shown by the image capture area data is close to the original color even when the color of the object is shifted from the original color due to a color of the illumination light.

In particular, in this embodiment, a combination between the mark irradiation unit 130 and the image capture unit 140 is fixed. For this reason, parameters for the color correction are able to be adjusted in advance and are able to be fixed. Accordingly, it is possible to correct the color with high accuracy.

Furthermore, in the description illustrated in FIG. 2, each constituent of the image capture device 10 is illustrated not as a hardware unit configuration, but as a functional unit block. Each constituent of the image capture device 10 is realized by arbitrarily combining hardware and software based on a CPU, a memory, and a program realizing the constituent of this drawing which is loaded in the memory, storage media such as hard disk storing the program, and an interface for network connection to an arbitrary computer. Then, a realization method and a realization device thereof include various modification examples.

Figure 3:
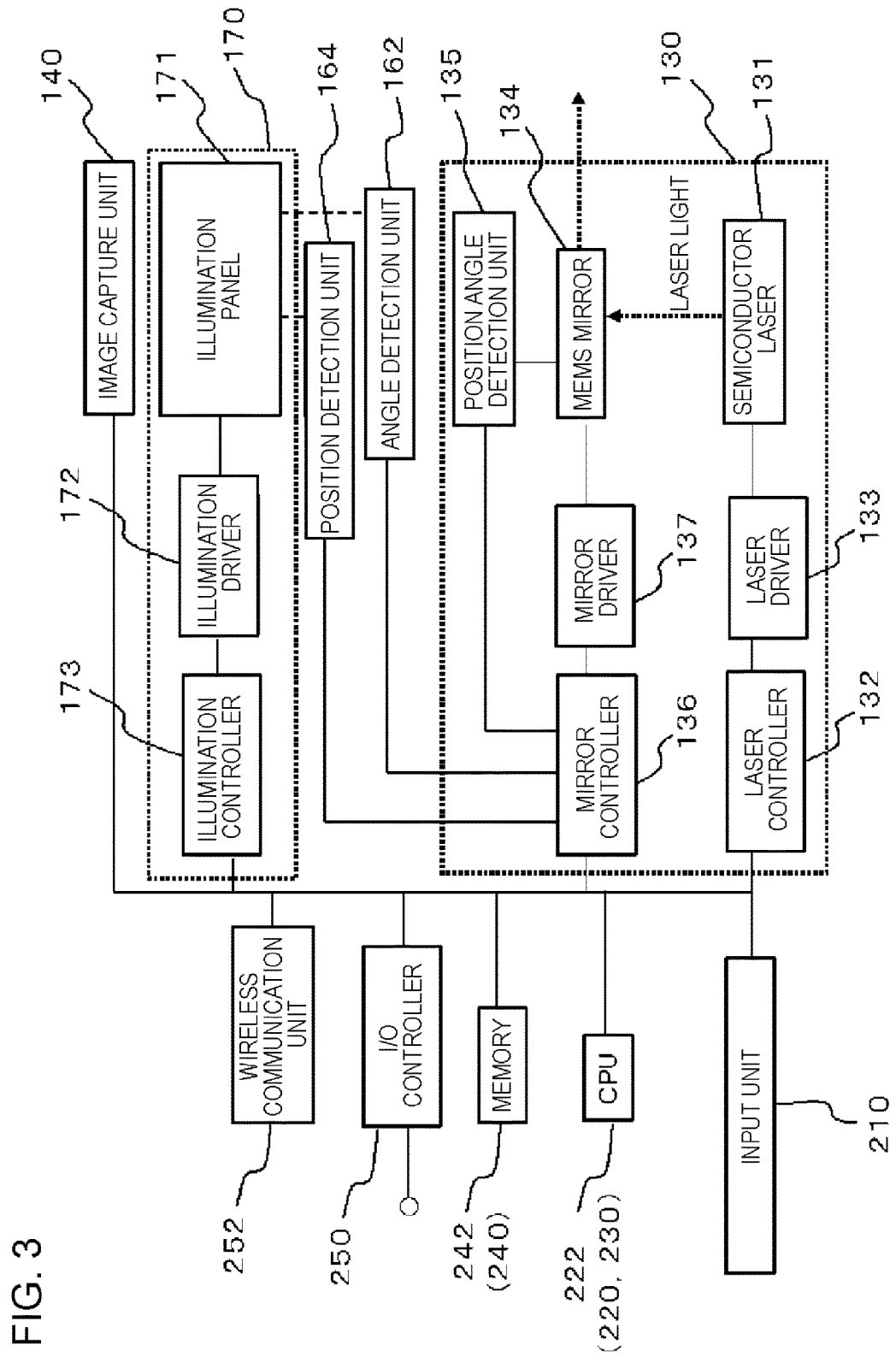
FIG. 3 is a diagram illustrating a hardware configuration of the image capture device illustrated in FIG. 2.

FIG. 3 is a diagram illustrating a hardware configuration of the image capture device 10 illustrated in FIG. 2. In an example illustrated in this drawing, the mark irradiation unit 130 includes a semiconductor laser 131, a laser controller 132, a laser driver 133, an MEMS mirror 134, the position angle detection unit 135, a mirror controller 136, and a mirror driver 137. The semiconductor laser 131 emits laser light for drawing the mark. The laser light, for example, is visible light. The laser controller 132 and the laser driver 133 control the semiconductor laser 131. The MEMS mirror 134 reflects the light emitted by the semiconductor laser 131. The MEMS mirror 134 changes a reflection direction of the light, and thus the mark is drawn. The reflection direction of the light due to the MEMS mirror 134 is controlled by the mirror controller 136 and the mirror driver 137. Specifically, the position angle detection unit 135 detects a direction in which the MEMS mirror 134 is directed. Then, the mirror controller 136 controls the MEMS mirror 134 through the mirror driver 137 by using a detection result of the position angle detection unit 135.

The illumination unit 170 includes an illumination panel 171, an illumination driver 172, and an illumination controller 173. The illumination panel 171, for example, is the organic EL panel described above. The illumination controller 173 and the illumination driver 172 control the illumination panel 171.

In addition, the image capture device 10 includes a CPU 222, a memory 242, an I/O controller 250, and a wireless communication unit 252. The CPU 222 corresponds to the control unit 220 and the image capture area data generation unit 230 in FIG. 2. These and the input unit 210, the laser controller 132, the mirror controller 136, and the illumination controller 173 are connected to each other.

Furthermore, the input unit 210, the CPU 222, the memory 242, the I/O controller 250, and the wireless communication unit 252 illustrated in FIG. 3 are built into the pedestal 110. However, the input unit 210 may be disposed outside the pedestal 110. In addition, the image capture area data generation unit 230 and the data storage unit 240 illustrated in FIG. 2 may be disposed in a device external to the image capture device 10. In this case, the image capture area data generation unit 230 and the data storage unit 240 may be connected to the image capture device 10 through a communication line, for example, a data communication network such as the Internet, and may be disposed to be attachable and detachable with respect to the image capture device 10, for example, by using a cable.

Figure 4:
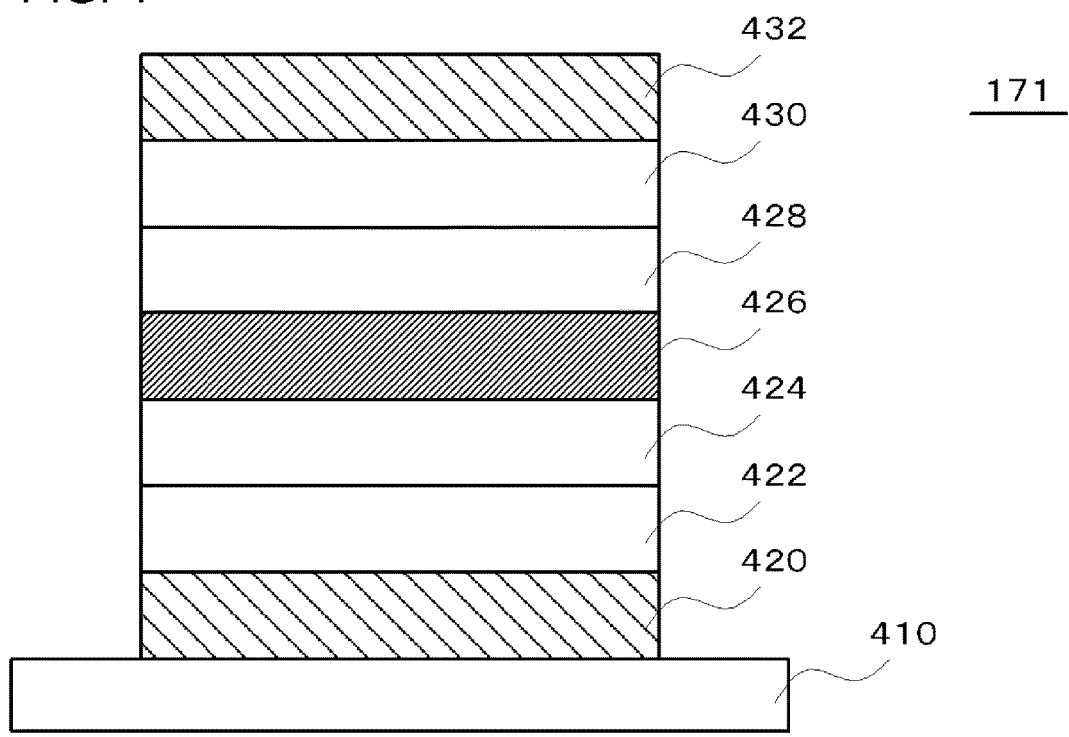
FIG. 4 is a cross-sectional view illustrating a structure of an organic EL element provided in an organic EL panel as an illumination panel.

FIG. 4 is a cross-sectional view illustrating a structure of the organic EL element provided in the organic EL panel as the illumination panel 171. The organic EL element has a laminated structure in which an anode 420, a hole injection layer 422, a hole transport layer 424, a light emitting layer 426, an electron transport layer 428, an electron injection layer 430, and a cathode 432 are laminated on a substrate 410 in this order. The substrate 410, for example, is quartz, glass, metal, or a resin such as plastic.

As a phosphorescent organic compound used for the light emitting layer 426, Bis(3,5-difluoro-2-(2-pyridyl) phenyl-(2-carboxypyridyl) iridium(III), Tris(2-phenylpyridine) iridium(III), and Bis(2-phenylbenzothiazolato) (acetylacetonate) iridium(III) which are iridium complexes, Osmium(II) bis(3-trifluoromethyl-5-(2-pyridyl)-pyrazolate) dimethylphenylphosphine which is an osmium complex, Tris(dibenzoylmethane) phenanthroline europium(III) of a rare earth compound, 2,3,7,8,12,13,17,18-Octaethyl-21H,23H-porphine, platinum(II) which is a platinum complex, and the like are able to be exemplified.

In addition, as an organic compound having electron transport properties which is a main component of the light emitting layer 426, the electron transport layer 428, and the electron injection layer 430, a polycyclic compound such as p-terphenyl or quaterphenyl, and derivatives thereof, a condensed polycyclic hydrocarbon compound such as naphthalene, tetracene, pyrene, coronene, chrysene, anthracene, diphenylanthracene, naphthacene, and phenanthrene, and derivatives thereof, a condensed heterocyclic compound such as phenanthroline, bathophenanthroline, phenanthridine, acridine, quinoline, quinoxaline, and phenazine, and derivatives thereof, fluoroscein, perylene, phthaloperylene, naphthaloperylene, perynone, phthaloperynone, naphthaloperynone, diphenyl butadiene, tetraphenyl butadiene, oxadiazole, aldazine, bisbenzoxazoline, bisstyryl, pyrazine, cyclopentadiene, oxine, aminoquinoline, imine, diphenyl ethylene, vinyl anthracene, diaminocarbazole, pyran, thiopyran, polymethine, merocyanine, quinacridone, rubrene, and the like, and derivatives thereof, and the like are able to be exemplified.

Further, as the organic compound having the electron transport properties, in a metal chelate complex compound, in particular, in a metal chelated oxanoid compound, a metal complex including at least one of 8-quinolinolato such as tris(8-quinolinolato) aluminum, bis(8-quinolinolato) magnesium, bis[benzo (f)-8-quinolinolato] zinc, bis(2-methyl-8-quinolinolato) (4-phenyl-phenolato) aluminum, tris(8-quinolinolato) indium, tris(5-methyl-8-quinolinolato) aluminum, 8-quinolinolato lithium, tris(5-chloro-8-quinolinolato) gallium, and bis (5-chloro-8-quinolinolato) calcium, and a derivative thereof as a ligand is also able to be exemplified.

In addition, as the organic compound having the electron transport properties, oxadiazoles, triazines, stilbene derivatives, distyrylarylene derivatives, styryl derivatives, and diolefin derivatives are also able to be preferably used.

Further, as an organic compound which is able to be used as the organic compound having the electron transport properties, benzoxazoles such as 2,5-bis(5,7-di-t-pentyl-2-benzoxazolyl)-1,3,4-thiazole, 4,4'-bis(5,7-t-pentyl-2-benzoxazolyl) stilbene, 4,4'-bis[5,7-di-(2-methyl-2-butyl)-2-benzoxazolyl] stilbene, 2,5-bis(5,7-di-t-pentyl-2-benzoxazolyl) thiophene, 2,5-bis[5-(α,α-dimethylbenzyl)-2-benzoxazolyl] thiophene, 2,5-bis[5,7-di-(2-methyl-2-butyl)-2-benzoxazolyl]-3,4-diphenyl thiophene, 2,5-bis(5-methyl-2-benzoxazolyl) thiophene, 4,4'-bis(2-benzoxazolyl) biphenyl, 5-methyl-2-{2-[4-(5-methyl-2-benzoxazolyl) phenyl] vinyl} benzoxazole, and 2-[2-(4-chlorophenyl) vinyl] naphtho(1,2-d) oxazole, benzothiazoles such as 2,2'-(p-phenylene divinylene)-bisbenzothiazole, 2-{2-[4-(2-benzimidazolyl) phenyl] vinyl} benzimidazole, 2-[2-(4-carboxyphenyl) vinyl] benzimidazole, and the like are included.

Further, as the organic compound having the electron transport properties, 1,4-bis(2-methylstyryl) benzene, 1,4-bis(3-methylstyryl) benzene, 1,4-bis(4-methylstyryl) benzene, distyrylbenzene, 1,4-bis(2-ethylstyryl) benzene, 1,4-bis(3-ethylstyryl) benzene, 1,4-bis(2-methylstyryl)-2-methyl benzene, 1,4-bis(2-methylstyryl)-2-ethylbenzene, and the like are also included.

In addition, as the organic compound having the electron transport properties, 2,5-bis(4-methylstyryl) pyrazine, 2,5-bis(4-ethylstyryl) pyrazine, 2,5-bis[2-(1-naphthyl) vinyl] pyrazine, 2,5-bis(4-methoxystyryl) pyrazine, 2,5-bis[2-(4-biphenyl) vinyl] pyrazine, 2,5-bis[2-(1-pyrenyl) vinyl] pyrazine, and the like are included.

In addition, as the organic compound having the electron transport properties, a known material used for manufacturing an organic EL element of the related art such as 1,4-phenylene dimethylidyne, 4,4'-phenylene dimethylidyne, 2,5-xylylene dimethylidyne, 2,6-naphthylene dimethylidyne, 1,4-biphenylene dimethylidyne, 1,4-p-terephenylene dimethylidyne, 9,10-anthracenediyl dimethylidyne, 4,4'-(2,2-di-t-butylphenylvinyl) biphenyl, and 4,4'-(2,2 diphenylvinyl) biphenyl is able to be suitably used.

On the other hand, as an organic compound having hole transport properties which is used for the hole transport layer 424 or a light emitting layer having hole transport properties, N,N,N',N'-tetraphenyl-4,4'-diaminophenyl, N,N'-diphenyl-N,N'-di(3-methylphenyl)-4,4'-diaminobiphenyl, 2,2-bis(4-di-p-tolylaminophenyl) propane, N,N,N',N'-tetra-p-tolyl-4,4'-diaminobiphenyl, bis(4-di-p-tolylaminophenyl) phenyl methane, N,N'-diphenyl-N,N'-di(4-methoxyphenyl)-4,4'-diaminobiphenyl, N,N,N',N'-tetraphenyl-4,4'-diaminodiphenyl ether, 4,4'-bis(diphenylamino) quadriphenyl, 4-N,N-diphenylamino-(2-diphenylvinyl) benzene, 3-methoxy-4'-N,N-diphenylamino stilbenzene, N-phenyl carbazole, 1,1-bis (4-di-p-triaminophenyl)-cyclohexane, 1,1-bis(4-di-p-triaminophenyl)-4-phenyl cyclohexane, bis(4-dimethylamino-2-methylphenyl)-phenyl methane, N,N,N-tri(p-tolyl) amine, 4-(di-p-tolylamino)-4'-[4(di-p-tolylamino) styryl] stilbene, N,N,N',N'-tetra-p-tolyl-4,4'-diamino-biphenyl, N,N,N',N'-tetraphenyl-4,4'-diamino-biphenyl-N-phenylcarbazole, 4,4'-bis[N-(1-naphthyl)-N-phenyl-amino] biphenyl, 4,4''-bis[N-(1-naphthyl)-N-phenyl-amino]p-terphenyl, 4,4'-bis[N-(2-naphthyl)-N-phenyl-amino] biphenyl, 4,4'-bis[N-(3-acenaphthenyl)-N-phenyl-amino] biphenyl, 1,5-bis[N-(1-naphthyl)-N-phenyl-amino] naphthalene, 4,4'-bis[N-(9-anthryl)-N-phenyl-amino] biphenyl, 4,4''-bis[N-(1-anthryl)-N-phenyl-amino] p-terphenyl, 4,4'-bis[N-(2-phenanthryl)-N-phenyl-amino] biphenyl, 4,4'-bis[N-(8-fluoranthenyl)-N-phenyl-amino] biphenyl, 4,4'-bis[N-(2-pyrenyl)-N-phenyl-amino] biphenyl, 4,4'-bis[N-(2-perylenyl)-N-phenyl-amino] biphenyl, 4,4'-bis[N-(1-coronenyl)-N-phenyl-amino] biphenyl, 2,6-bis (di-p-tolylamino) naphthalene, 2,6-bis[di-(1-naphthyl) amino] naphthalene, 2,6-bis[N-(1-naphthyl)-N-(2-naphthyl) amino] naphthalene, 4,4''-bis[N,N-di(2-naphthyl) amino] terphenyl, 4,4'-bis{N-phenyl-N-[4-(1-naphthyl) phenyl]

amino} biphenyl, 4,4'-bis[N-phenyl-N-(2-pyrenyl)-amino] biphenyl, 2,6-bis[N,N-di(2-naphthyl) amino] fluorene, 4,4"-bis(N,N-di-p-tolylamino) terphenyl, bis(N-1-naphthyl)(N-2-naphthyl) amine, and the like are able to be exemplified.

Further, as the organic compound having the hole transport properties, a material in which the organic compound described above is dispersed in a polymer, or a material in which the organic compound described above is polymerized is able to be used. A so-called π conjugated polymer such as polyparaphenylene vinylene or derivatives thereof, a non-conjugated polymer having hole transport properties which is represented as poly(N-vinylcarbazole), and a sigma conjugated polymer such as polysilanes are also able to be used.

A material of the hole injection layer 422 is not particularly limited, and as the material of the hole injection layer 422, metal phthalocyanines such as copper phthalocyanine (CuPc), metal-free phthalocyanines, a carbon film, and a conductive polymer such as polyaniline are able to be preferably used.

Then, by adjusting a thickness or a material of each layer laminated on the substrate 410, it is possible to adjust sharpness of a spectrum of light emitted by the illumination panel 171.

Figure 5:
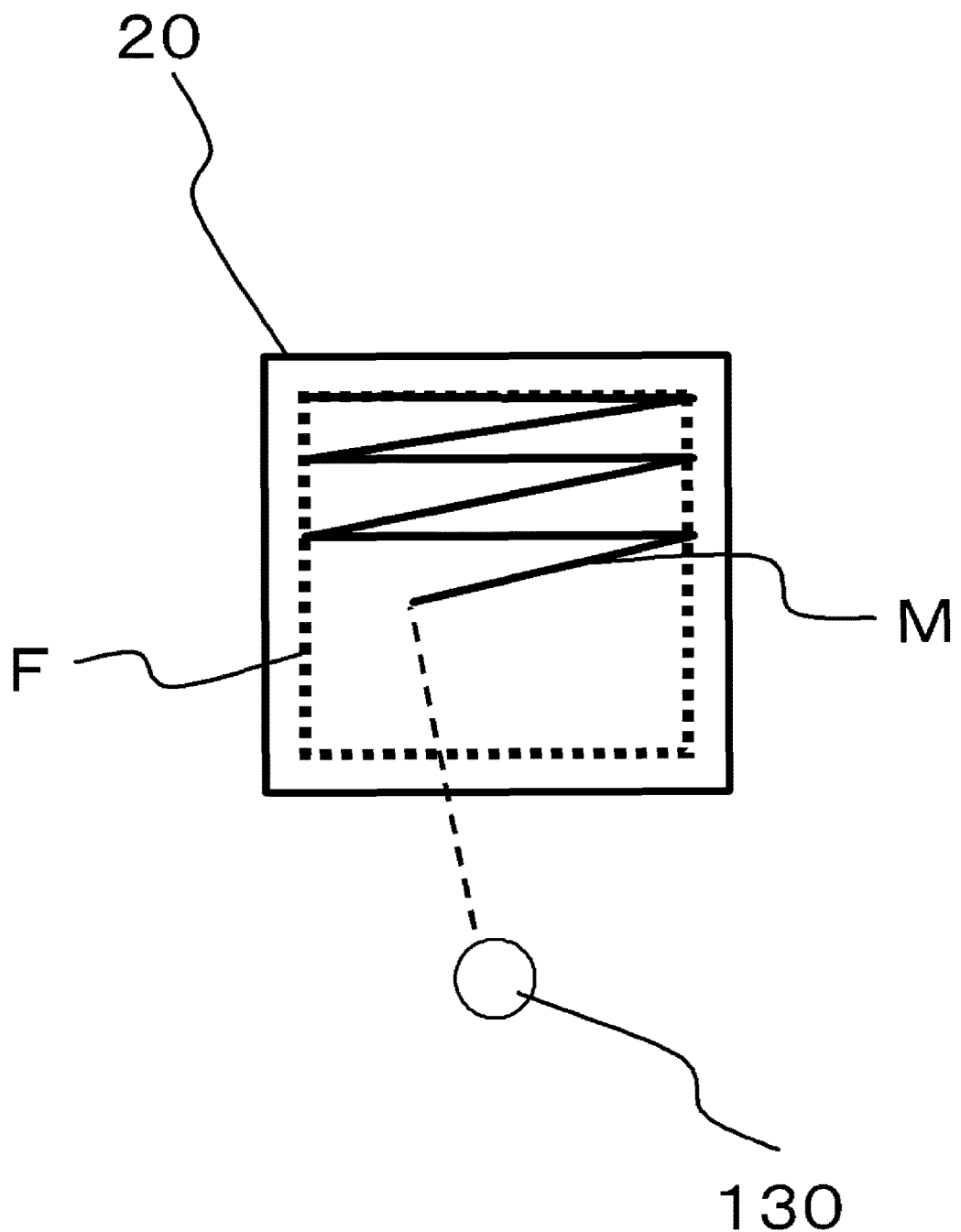
FIG. 5 is a diagram illustrating a first example of a mark irradiation of a mark irradiation unit.

FIG. 5 is a diagram illustrating a first example of irradiation of a mark M of the mark irradiation unit 130. In an example illustrated in this drawing, the mark irradiation unit 130 emits laser light to scan an entire region of an image capture area F.

Figure 6A:
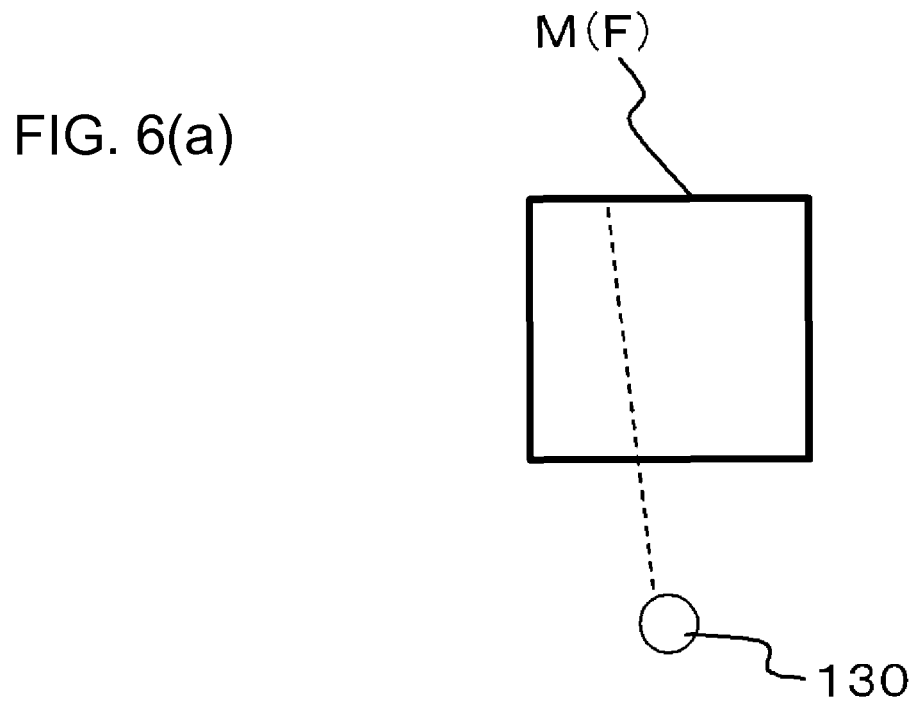
FIGS. 6(a) and 6(b) a diagram illustrating another example of the mark irradiation of the mark irradiation unit.

FIG. 6(a) is a diagram illustrating a second example of the irradiation of the mark M of the mark irradiation unit 130. In an example illustrated in this drawing, the mark irradiation unit 130 emits the laser light to draw an edge of the image capture area F.

Figure 6B:
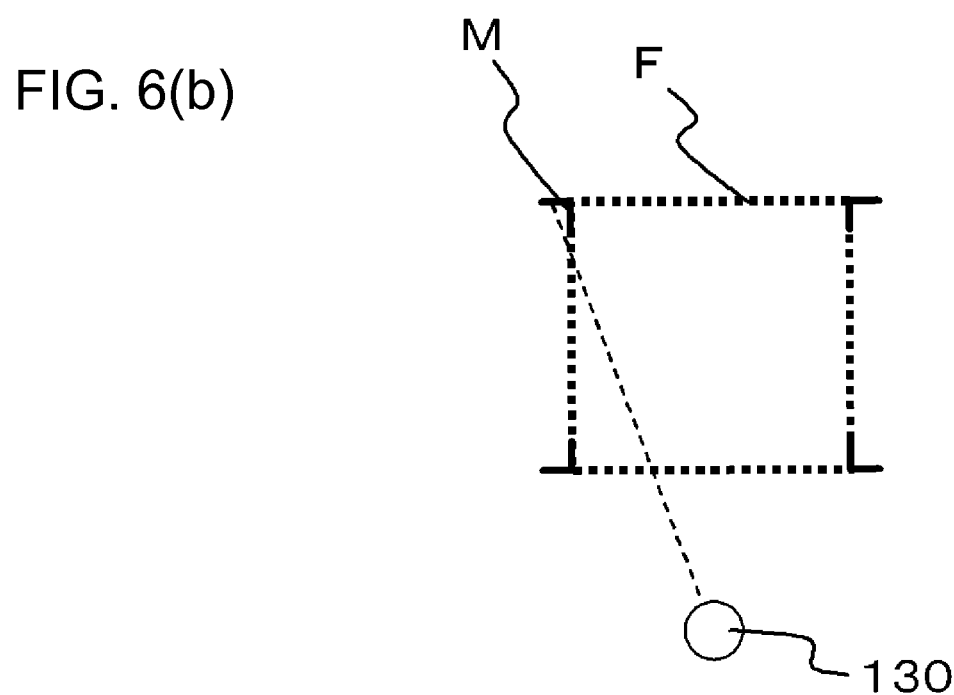

FIG. 6(b) is a diagram illustrating a third example of the irradiation of the mark M of the mark irradiation unit 130. In an example illustrated in this drawing, the image capture area F is rectangular. Thus, the mark irradiation unit 130 draws marks each indicating four corners of the image capture area F by the laser light.

Furthermore, a shape and a scan method of the mark M of the mark irradiation unit 130 are not limited to the above-described examples.

Figure 7:
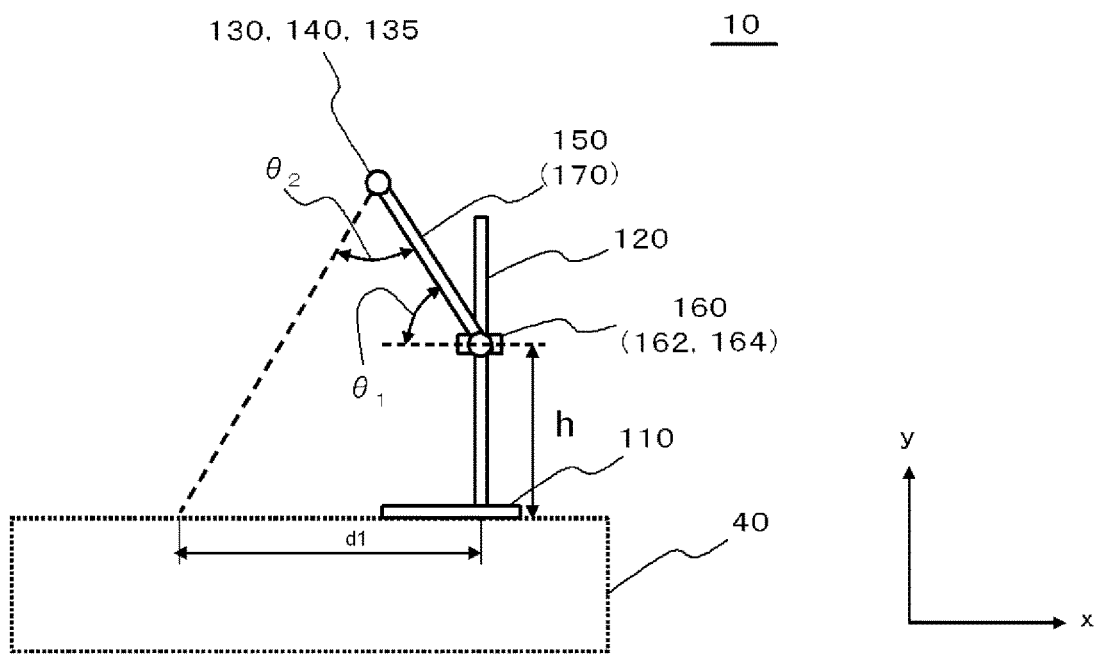
FIG. 7 is a diagram illustrating an example of a method in which a control unit corrects an irradiation range of the mark irradiation unit, and thus the mark is formed in a desired shape.

FIG. 7 is a diagram illustrating an example of a method in which the control unit 220 corrects an irradiation range of the light of the mark irradiation unit 130, and thus the mark is formed in a desired shape. The control unit 220 controls the irradiation angle of the light emitted by the mark irradiation unit 130 by using a direction of the object when based on the image capture unit 140, and a distance from the object to the image capture unit 140. Hereinafter, the details will be described.

As described above, the angle detection unit 162 detects the angle of the holding member 150 with respect to the guide member 120, that is, the angle of the mark irradiation unit 130 with respect to the guide member 120. The control unit 220 calculates an angle $\theta_1$ of the mark irradiation unit 130 with respect to a surface of a mounting portion 40 (for example, a desk) on which the object is mounted from the detection result of the angle detection unit 162. Furthermore, the angle detection unit 162 may be configured to directly detect the angle $\theta_1$ of the mark irradiation unit 130 with respect to the surface of the mounting portion 40.

In addition, the position angle detection unit 135 detects an angle of a reference position (for example, a center) of the mark irradiation unit 130 with respect to the holding member 150. In addition, the control unit 220 stores data indicating an angle of the light emitted by the mark irradiation unit 130 with respect to a reference axis (for example, an axis vertically passing through the center) of the mark irradiation unit 130 as a part of control parameters of the mark irradiation unit 130. For this reason, the control unit 220 is able to calculate an angle $\theta_2$ of the light emitted by the mark irradiation unit 130 with respect to the holding member 150. The angle $\theta_2$ corresponds to the direction of the object when the image capture unit 140 is set as a reference.

In addition, a length of the holding member 150 is a fixed value. For this reason, the control unit 220 is able to calculate a distance (a distance in an x direction in the drawings) from the guide member 120 to the mark irradiation unit 130 in a plane which is parallel to the mounting portion 40 by using the length of the holding member 150 and the angle $\theta_1$. Further, the control unit 220 is able to calculate a height (a distance in a y direction in the drawings) of the mark irradiation unit 130 when the surface of the mounting portion 40 is set as a reference by using a detection result h of the position detection unit 164, the length of the holding member 150, and the angle $\theta_1$. The height corresponds to the distance from the image capture unit 140 to the object. Then, the control unit 220 is able to calculate a distance $d_1$ from the guide member 120 to an irradiation position of the light by using these distances and the angles $\theta_1$ and $\theta_2$.

Then, the control unit 220 is able to recognize the irradiation position of the light of the mark irradiation unit 130 by using the distance $d_1$ and the angles $\theta_1$ and $\theta_2$. By recognizing the irradiation position, the control unit 220 is able to control the mark irradiation unit 130 such that the image capture area shown by the mark is in a desired shape.

Figure 8:
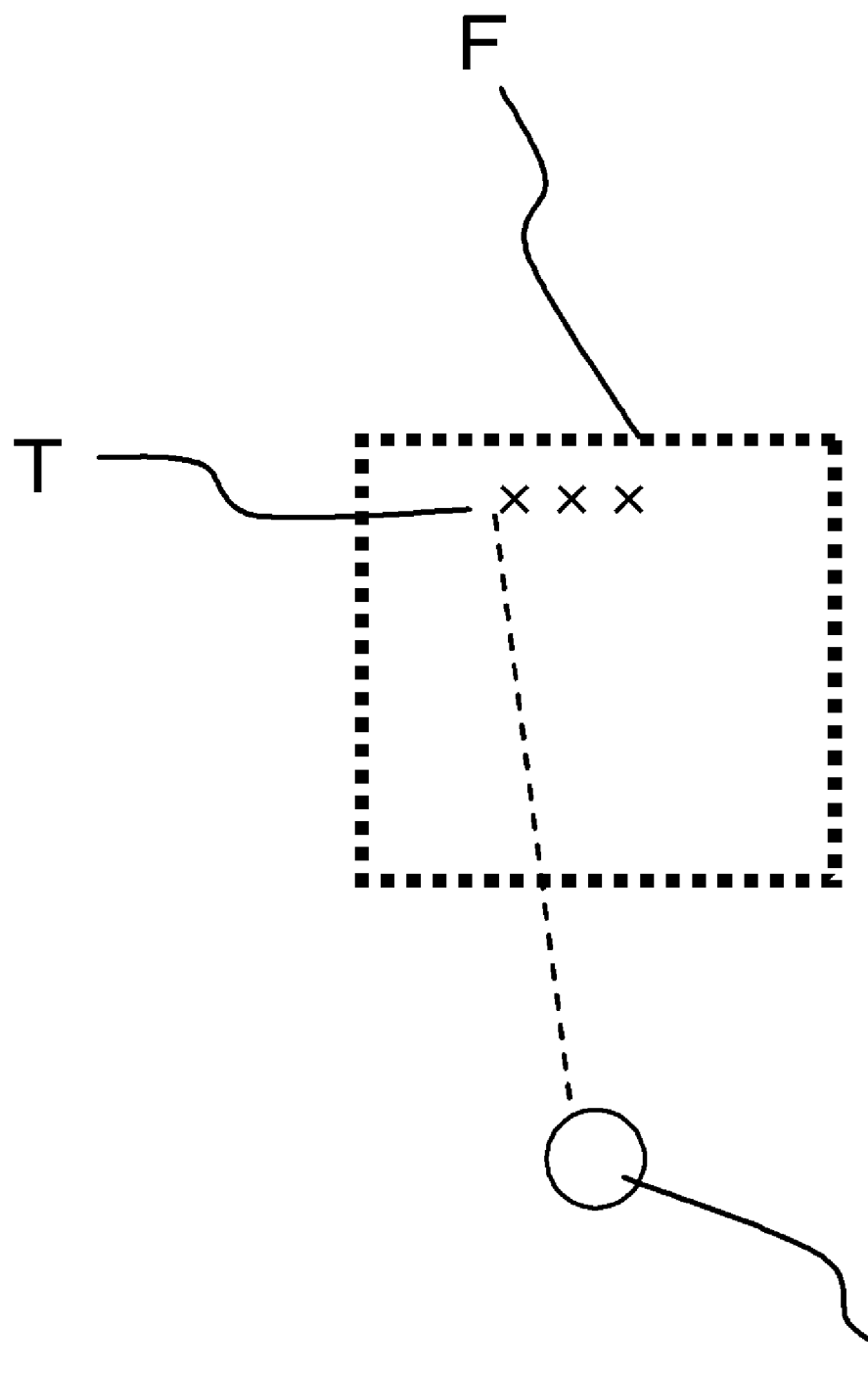
FIG. 8 is a diagram for describing another function of the mark irradiation unit.

FIG. 8 is a diagram for describing another function of the mark irradiation unit 130. The mark irradiation unit 130 also has a function of drawing information such as a character in addition to a function of emitting the mark indicating the image capture area. The information drawn by the mark irradiation unit 130, for example, may be input from the input unit 210 illustrated in FIG. 2, or may be information maintained in the control unit 220. The information drawn by the mark irradiation unit 130, for example, may be the illumination parameters used for controlling the illumination panel 171, or date information from a calendar or the like included in the CPU 222 (the control unit 220) or the like. As described above, the illumination parameters are information indicating each intensity of the plurality of colors of the light emitted by the illumination unit 170, but are not limited thereto. Then, character information is included in the image capture area data, and thus it is possible to integrally store the image capture area data and the character information.

In particular, when the object is a commercial product, and the illumination unit 170 of the image capture device 10 is used as an illumination illuminating the commercial product, it is possible to integrally store illumination parameters of the illumination of the commercial product and image data obtained by capturing an image of the commercial product. This allows to easily reproduce illumination conditions of the commercial product.

In addition, when the object is a commercial product, and the image capture device 10 is used in a display place of the commercial product, the information drawn by the mark irradiation unit 130 may be a description of the object. In this case, the illumination unit 170 of the image capture device 10 is used as an illumination illuminating the commercial product.

Furthermore, a laser with which the mark irradiation unit 130 draws information such as a character may be disposed separately from the laser drawing the mark. In this case, when the laser drawing the information such as a character is an infrared laser, the image capture unit 140 may detect both visible light and infrared light. Then, even when the illumination parameters are drawn in the display place of the commercial product, the illumination parameters are not visible to the observer, and thus a design of display of the commercial product is not affected.

Figure 9:
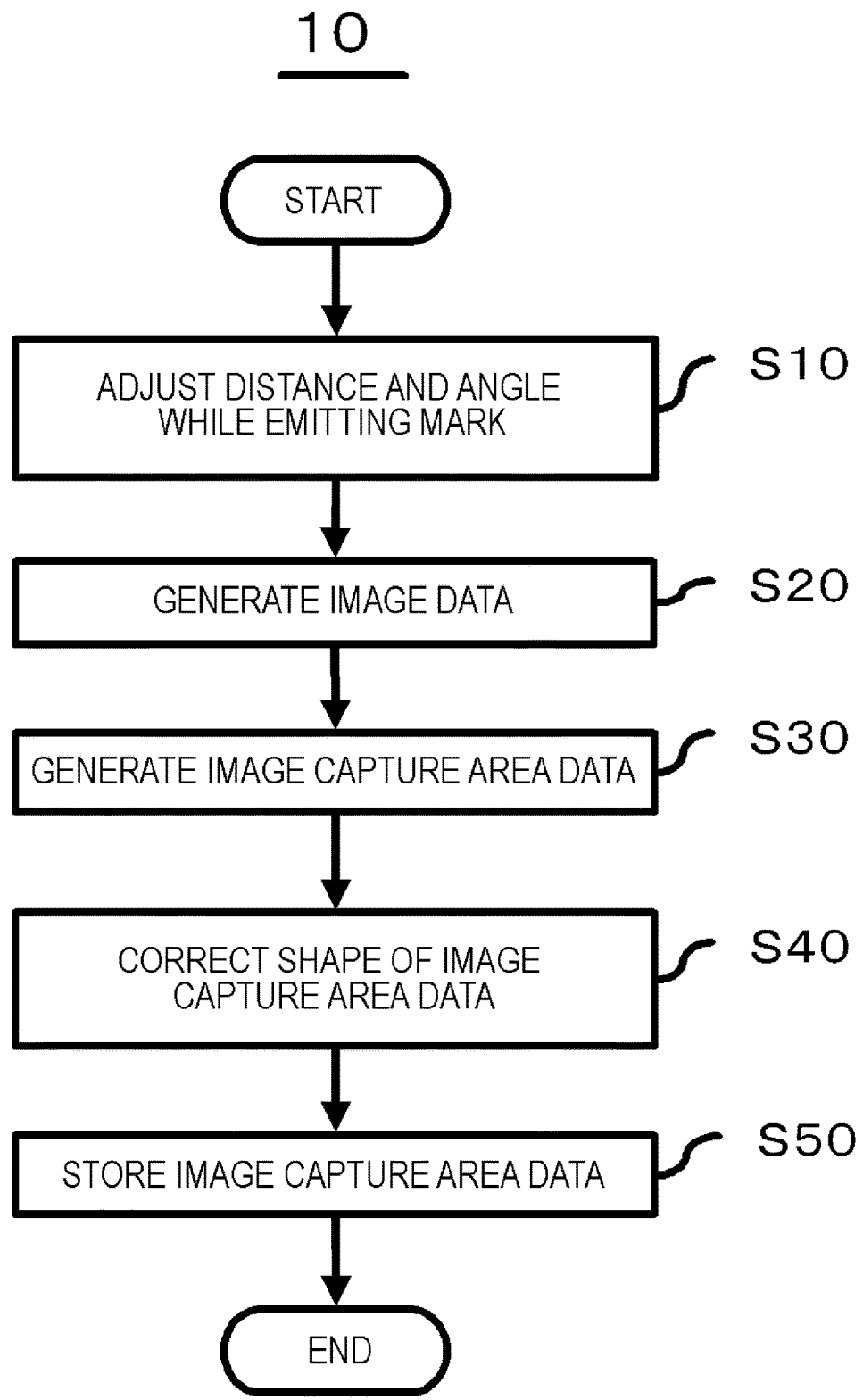
FIG. 9 is a flowchart illustrating a first example of an operation of the image capture device.

FIG. 9 is a flowchart illustrating a first example of an operation of the image capture device 10. First, the user of the image capture device 10 adjusts the height and the angle of the holding member 150, and the angle of the edge portion 155 with respect to the holding member 150 while allowing the mark irradiation unit 130 to irradiate with the mark. At this time, the user may adjust the irradiation range of the light by performing input with respect to the input unit 210. Accordingly, the user is able to adjust the image capture area shown by the mark to be in a desired range (Step S10).

Subsequently, the image capture unit 140 generates the image data at a timing when an image capture command from the user is input (Step S20).

Subsequently, the image capture area data generation unit 230 recognizes a position of the mark in the image data generated by the image capture unit 140, and cuts out image capture area data from the image data on the basis of the recognized position of the mark (Step S30). Subsequently, the image capture area data generation unit 230 performs the trapezoid correction with respect to the generated image capture area data (Step S40). Then, the image capture area data generation unit 230 stores the image capture area data after being subjected to the trapezoid correction in the data storage unit 240 (Step S50).

Figure 10:
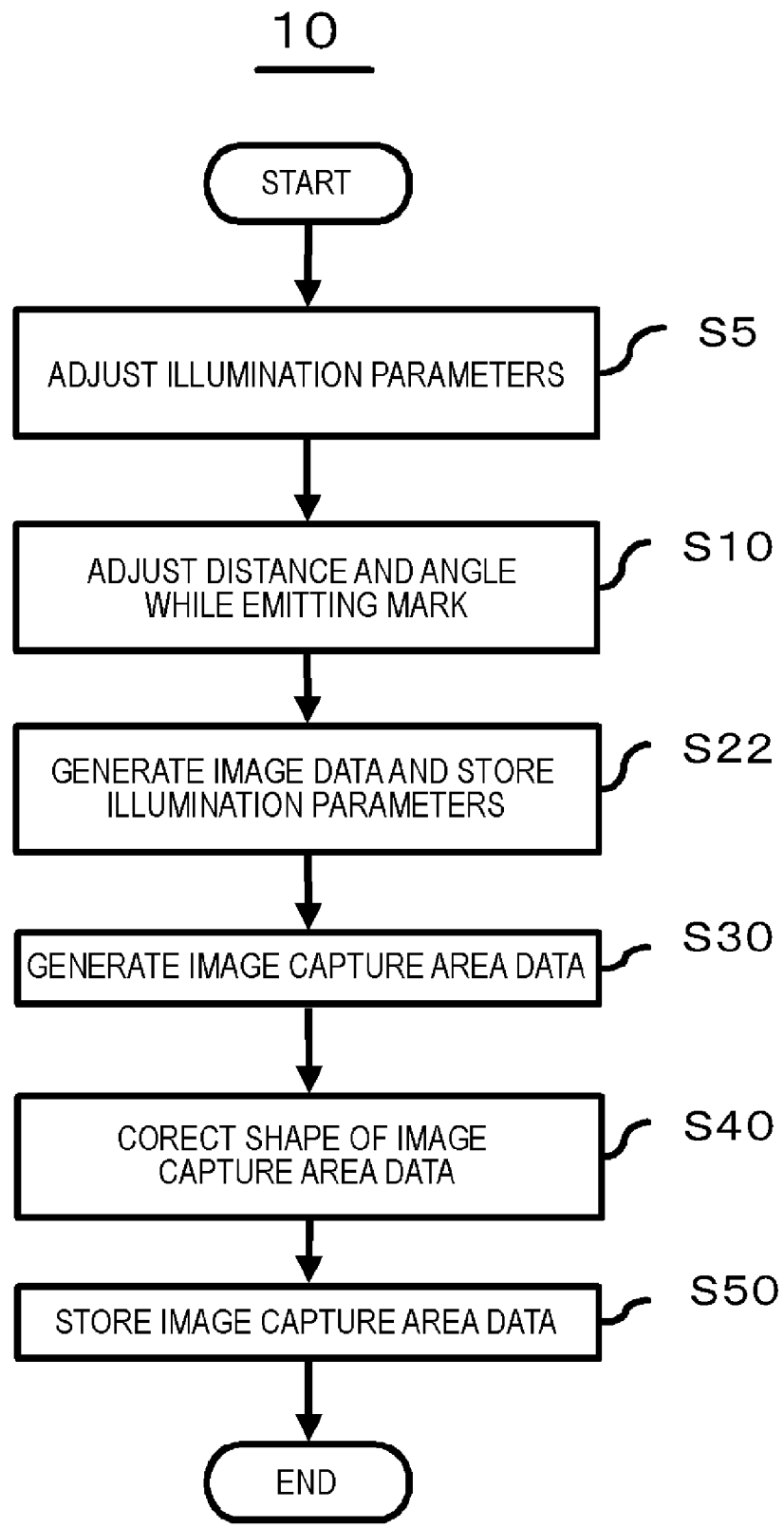
FIG. 10 is a flowchart illustrating a second example of the operation of the image capture device.

FIG. 10 is a flowchart illustrating a second example of the operation of the image capture device 10. First, the user of the image capture device 10 adjusts the illumination parameters of the illumination unit 170, and adjusts a color or intensity of the illumination of the illumination unit 170 (Step S5). Subsequently, the user adjusts the height and the angle of the holding member 150, and the angle of the edge portion 155 with respect to the holding member 150, and thus the image capture area shown by the mark is brought into a desired range (Step S10).

Subsequently, the image capture unit 140 generates the image data according to the input from the user. At this time, the control unit 220 stores the illumination parameters in the data storage unit 240 (Step S22).

Subsequent processings (Step S30 to Step S50) are identical to that of the first example. However, in Step S50, the image capture area data generation unit 230 associates the image capture area data with the illumination parameters stored in Step S22.

Figure 11:
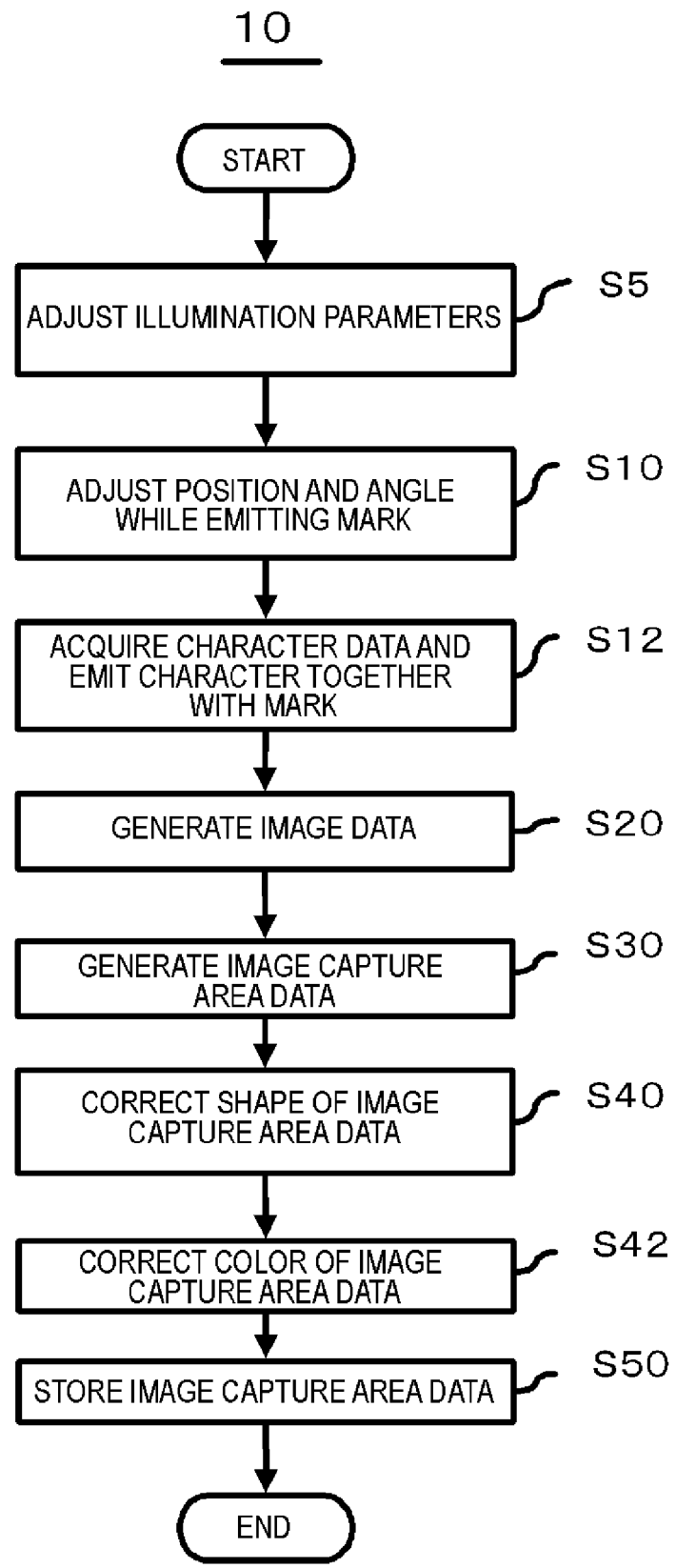
FIG. 11 is a flowchart illustrating a third example of the operation of the image capture device.

FIG. 11 is a flowchart illustrating a third example of the operation of the image capture device 10. Processings illustrated in Step S5 and Step S10 are identical to that of the second example. After Step S10, the control unit 220 acquires character data to be drawn on the object, and draws the acquired character data on the object together with the mark (Step S12). In this state, the image capture unit 140 captures the image of the object, and generates the image capture data (Step S20). Information indicated by the character data is as described with reference to FIG. 8.

Processings illustrated in Step S30 and Step S40 are identical to that of the second example. The image capture area data generation unit 230 performs the trapezoid correction with respect to the image capture area data (Step S40), and then corrects a color of the image capture area data by using the illumination parameters (Step S42). Then, the image capture area data generation unit 230 stores the image capture area data in the data storage unit 240 (Step S50).

As described above, according to this embodiment, the mark irradiation unit 130 irradiates the object with the mark. The image capture unit 140 captures the image of the object, and generates the image data. Then, the image capture area data generation unit 230 recognizes the position of the mark in the object, and cuts out the image capture area data which is apart of the image data on the basis of the mark. For this reason, since the mark irradiation unit 130 irradiates the object with the mark, even when the positioning symbol is not printed on the object to be stored as the image data, only a necessary portion in the image data is able to be cut out.

In addition, in this embodiment, the image capture area data generation unit 230 recognizes the position of the mark in the image data, and thus cuts out the image capture area data. For this reason, a calculation amount for generating the image capture area data is reduced.

In addition, the control unit 220 controls the angle of the mark which is emitted by the mark irradiation unit 130 by using the direction of the object when the image capture unit 140 is set as a reference, and the distance from the object to the image capture unit 140, so that an image capture area shown by the mark irradiation unit 130 becomes a desired shape (for example, a square or a rectangle). For this reason, a calculation amount of the trapezoid correction of the image capture area data generation unit 230 is reduced.

In addition, the holding member 150 is vertically movable along the guide member 120, and is rotatably attached by using the attachment portion 160 as the center. For this reason, the user of the image capture device 10 is able to easily set a range of the image capture area shown by the mark to be in a desired size by adjusting the height and the angle of the holding member 150.

(Second Embodiment)

An image capture device 10 according to a second embodiment has the same configuration as that of the image capture device 10 according to the first embodiment except for the following matters.

First, the mark irradiation unit 130 does not perform the irradiation of the mark when the image capture unit 140 generates the image data. For example, when an image capture command with respect to the image capture unit 140 is input from the input unit 210, the control unit 220 ends the irradiation of the mark of the mark irradiation unit 130 at this timing. Then, the control unit 220 and the image capture area data generation unit 230 calculate a position at which that the mark is estimated to have existed in the image data on the basis of a field angle of the image capture unit 140, an irradiation direction of the mark of the mark irradiation unit 130, and the distance from the object to the mark irradiation unit 130 and the image capture unit 140. Specifically, the control unit 220 and the image capture area data generation unit 230 calculate the position at which that the mark is estimated to have existed in the image data by using the detection results of the angle detection unit 162, the position detection unit 164, and the position angle detection unit 135, the irradiation direction of the mark of the mark irradiation unit 130, and the field angle of the image capture unit 140. Then, the image capture area data generation unit 230 generates the image capture area data by using this estimated position.

Figure 12:
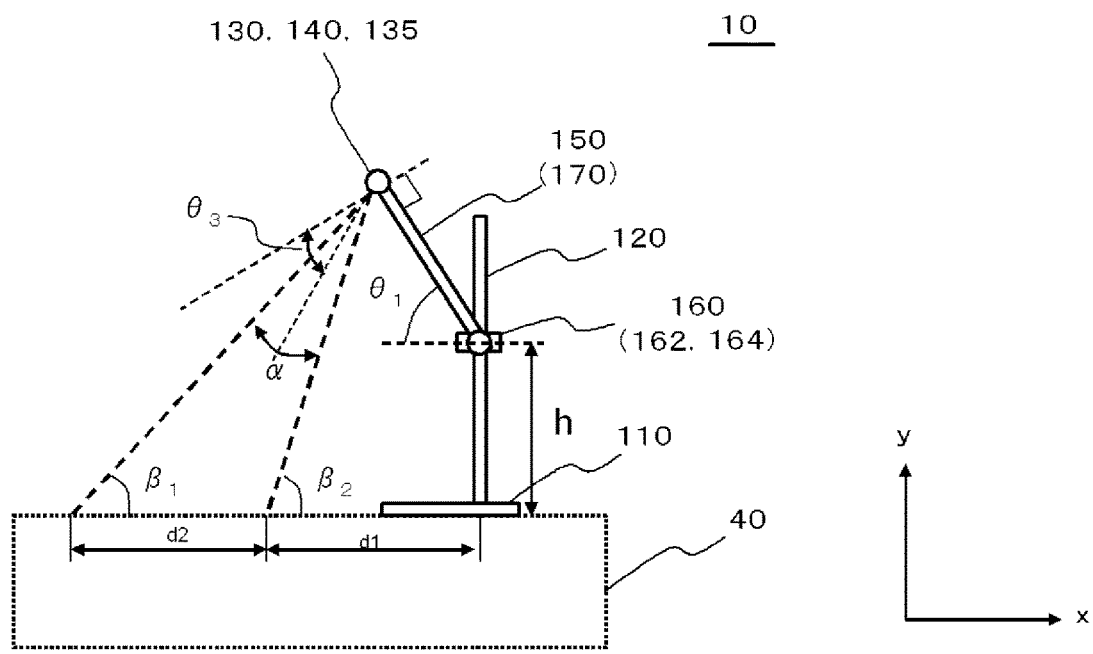
FIG. 12 is a diagram for describing a method of calculating an estimated position of a mark in a second embodiment.

FIG. 12 is a diagram for describing a calculation method of the estimated position of the mark of the image capture area data generation unit 230. The mark irradiation unit 130 performs control such that the center of the image capture area shown by the mark is coincident with the center of the image capture area of the image capture unit 140.

As described in the first embodiment, the control unit 220 calculates the angle $\theta_1$ of the mark irradiation unit 130 with respect to the surface of the mounting portion 40 (for example, a desk) on which the object is mounted from the detection result of the angle detection unit 162. In addition, the position angle detection unit 135 detects an angle $\theta_3$ of the center of the mark irradiation unit 130 with respect to the holding member 150. In addition, the control unit 220 is able to acquire an angle $\alpha$ of an irradiation range when the mark irradiation unit 130 emits the mark indicating the image capture area. For this reason, the control unit 220 is able to calculate an angle $\beta_1$ of the image capture unit 140 with respect to an upper end of the image capture area shown by the mark by using the angles $\alpha$, $\theta_1$, and $\theta_3$, and is able to calculate an angle $\beta_2$ of the image capture unit 140 with respect to a lower end of the image capture area shown by the mark.

In addition, as described in the first embodiment, the control unit 220 is able to calculate the distance (the distance in the x direction in the drawings) from the guide member 120 to the mark irradiation unit 130 and the height of the mark irradiation unit 130 (the distance in the y direction in the drawings) when the surface of the mounting portion 40 is set as a reference. The control unit 220 is able to calculate the distance $d_1$ from the guide member 120 to the lower end of the image capture area by using the distance, the height, and the angle $\beta_1$, and is able to calculate a distance $(d_1+d_2)$ from the guide member 120 to the upper end of the image capture area by using the distance, the height, and the angle $\beta_2$. The distances $d_1$ and $(d_1+d_2)$ indicate the position of the mark indicating the image capture area.

In addition, the control unit 220 stores the field angle of the image capture unit 140. For this reason, the control unit 220 is able to calculate which region of the surface of the mounting portion 40 the image data generated by the image capture unit 140 indicates by using a method which is identical to the calculation method of the position of the mark. Further, a positional relationship between the angle $\theta_3$ of the center of the mark irradiation unit 130 with respect to the holding member 150 and the field angle of the image capture unit 140 is fixed. For this reason, the image capture area data generation unit 230 is able to calculate the position at which that the mark is estimated to have existed in the image data by using the data calculated by the control unit 220.

According to this embodiment, the same effect as that of the first embodiment is able to be obtained. In addition, when the image capture unit 140 generates the image data, the mark irradiation unit 130 does not perform the irradiation of the mark. For this reason, it is possible to prevent the mark of the mark irradiation unit 130 from being inserted into the image area data.

(Third Embodiment)

Figure 13:
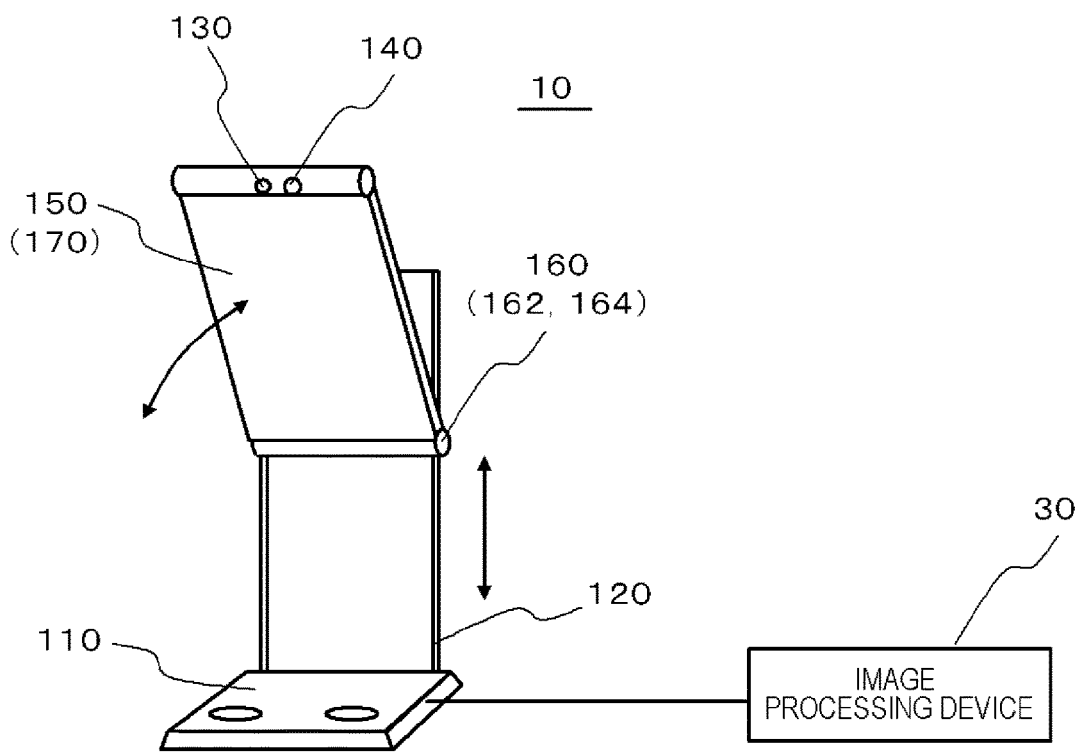
FIG. 13 is a diagram illustrating a configuration of an image capture device according to a third embodiment.

FIG. 13 is a diagram illustrating a configuration of the image capture device 10 according to a third embodiment, and corresponds to FIG. 1 in the first embodiment. The image capture device 10 according to this embodiment has the same configuration as that of the image capture device 10 according to the first or the second embodiment except that an image processing device 30 is provided. The image processing device 30 performs at least a part of the image processing performed by the image capture area data generation unit 230 in the first embodiment.

Figure 14:
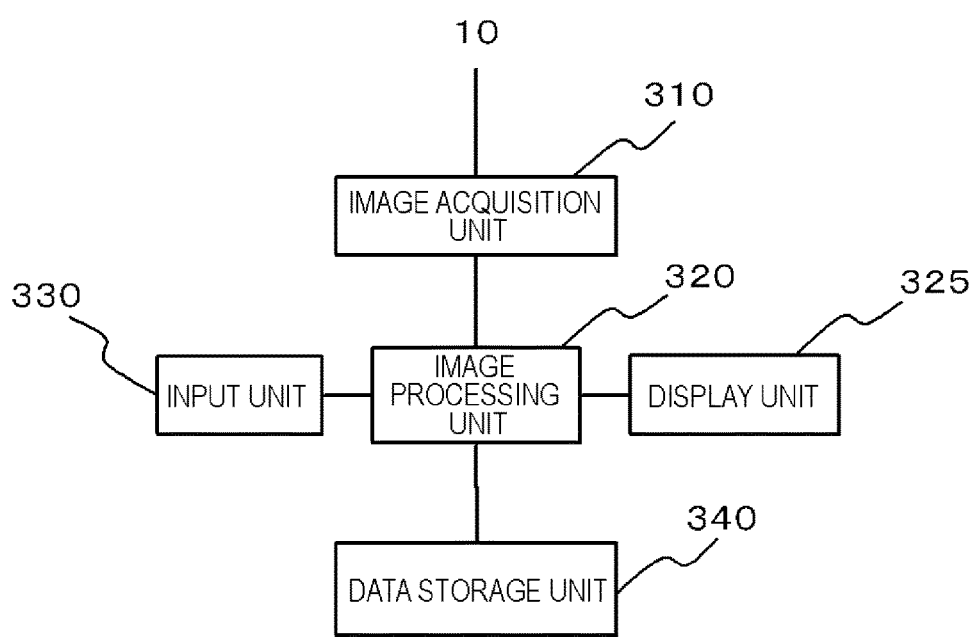
FIG. 14 is a block diagram illustrating a functional configuration of the image processing device.

FIG. 14 is a block diagram illustrating a functional configuration of the image processing device 30. The image processing device 30 includes an image acquisition unit 310, an image processing unit 320, a display unit 325, an input unit 330, and a data storage unit 340. The image acquisition unit 310 receives the image area data generated by the image capture area data generation unit 230 from the image capture device 10. The image acquisition unit 310 receives the image area data through the I/O controller 250 or the wireless communication unit 252 of the image capture device 10. The image processing unit 320 processes the image data received by the image acquisition unit 310. The display unit 325 displays the image data after being processed by the image processing unit 320. The input unit 330 receives information input from the user of the image capture device 10. The input information indicates parameters of the image processing of the image processing unit 320. The data storage unit 340 stores the image data after being processed by the image processing unit 320. The data storage unit 340 may be a nonvolatile memory, or may be hard disk.

Figure 15:
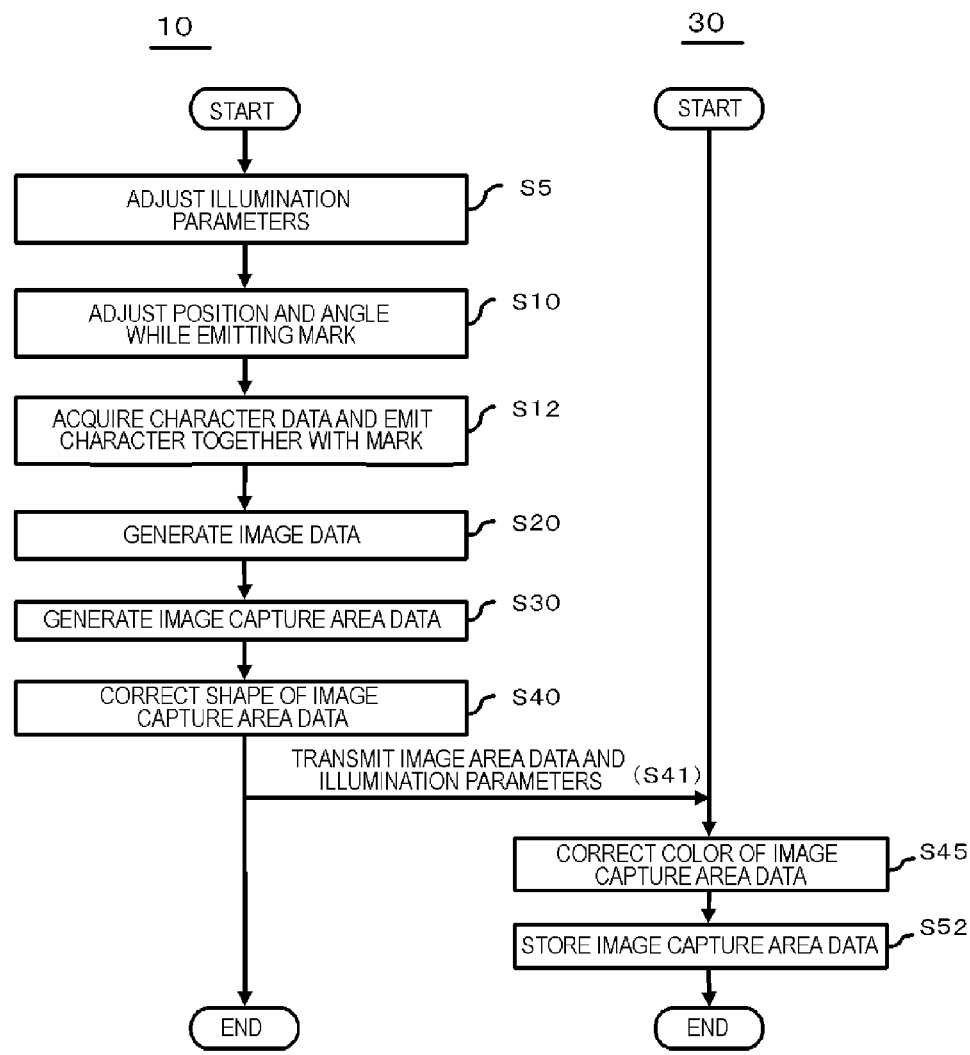
FIG. 15 is a flowchart for describing a first example of processing performed by the image processing device.

FIG. 15 is a flowchart for describing a first example of processing performed by the image processing device 30. Processings from Step S5 to Step S40 are identical to that of the processing described with reference to FIG. 11 in the first embodiment. When the image capture area data generation unit 230 performs the trapezoid correction with respect to the image area data (Step S40), the image capture area data generation unit 230 transmits the image capture area data after being corrected to the image processing device 30. At this time, the image capture area data generation unit 230 also transmits the illumination parameters used in the illumination unit 170 to the image processing device 30 (Step S41).

The image acquisition unit 310 of the image processing device 30 receives the image capture area data and the illumination parameters which have been transmitted by the image processing device 30. The image processing unit 320 corrects the color of the image capture area data by using the illumination parameters received by the image acquisition unit 310. The image processing unit 320 displays the image capture area data after being corrected on the display unit 325. Then, when the user of the image capture device 10 views the image displayed on the display unit 325, the user inputs an amendment command for the correction to the input unit 330 as necessary. The image processing unit 320 amends the correction of the color of the image capture area data according to the input amendment command (Step S45).

Then, the image processing unit 320 stores the image area data after being corrected in the data storage unit 340 (Step S52)

FIG. 16 is a flowchart for describing a second example of the processing performed by the image processing device 30. An example illustrated in this drawing is identical to the first example illustrated in FIG. 14 except that the trapezoid correction is also performed by the image processing device 30 (Step S43).

Processings from Step S5 to Step S30 are identical to the processing described with reference to FIG. 15. The image capture area data generation unit 230 transmits the image area data before the trapezoid correction to the image processing device 30 in association with the detection results of the angle detection unit 162, the position detection unit 164, and the position angle detection unit 135, and the illumination parameters (Step S31).

The image acquisition unit 310 of the image processing device 30 receives the data which has been transmitted by the image processing device 30. Then, the image processing unit 320 performs the trapezoid correction (Step S43). Processings performed herein are identical to the processings performed in Step S40 of the FIG. 15.

Subsequent processings (Steps S45 and S52) are identical to that of the first example illustrated in FIG. 15.

According to this embodiment, the same effect as that of the first or the second embodiment is able to be obtained. In addition, the image processing is performed by using the image processing device 30, and thus it is possible to perform the image processing having a high calculation amount with respect to the image area data. In addition, the image processing unit 320 amends the image processing according to the input of the user. For this reason, it is possible to correct the image area data according to preference of the user.

As described above, the embodiments of the present invention are described with reference to the drawings, but the embodiments are examples of the present invention, and various configurations other than the configurations described above are able to be adopted.

The invention claimed is:

1. An image capture device, comprising:
   a mark irradiation unit which irradiates an object with a mark;
   an image capture unit which captures an image of the object and generates image data;
   an image capture area data generation unit which recognizes a position of the mark in the image data, and cuts out image capture area data which is a part of the image data based on the position of the mark;
   a control unit which controls an irradiation angle of the mark by using a direction of the object when based on the image capture unit, and a distance from the object to the image capture unit;
   a holding member which holds the image capture unit;
   a guide member to which the holding member is attached to be movable and rotatable;
   a pedestal to which the guide member is attached;
   an angle detection unit which detects an angle of the holding member with respect to the guide member; and
   a position detection unit which detects a position of the holding member in the guide member,
   wherein the control unit calculates the direction of the object when based on the image capture unit by using a detection result of the angle detection unit, and calculates a distance of the image capture unit with respect to the object by using a detection result of the position detection unit,
   wherein the image capture area data generation unit calculates the position of the mark in the image data based on a field angle of the image capture unit, an irradiation direction of the mark irradiation unit, and a distance from the object to the image capture unit and the mark irradiation unit.

2. The image capture device according to claim 1, wherein the image capture area data generation unit corrects a distortion of the image capture area data based on the position of the mark in the image capture area data or a shape of the mark.

3. The image capture device according to claim 1, wherein the image capture area data generation unit stores correction parameters for correcting a distortion of the image capture area data due to an individual difference in at least one of the image capture unit and the mark irradiation unit, and corrects the image capture area data by using the correction parameters.

4. The image capture device according to claim 1, further comprising:
   an illumination unit which irradiates the object with illumination light.

5. The image capture device according to claim 4, wherein the illumination unit emits a plurality of colors of light as the illumination light.

6. The image capture device according to claim 5, further comprising:
   an illumination control unit which controls intensities of the plurality of colors of light independently of each other,
   wherein the image capture area data generation unit receives illumination parameters indicating each intensity of the plurality of colors of light from the illumination control unit, and corrects the image capture area data by using the illumination parameters.

7. The image capture device according to claim 4, wherein the mark irradiation unit irradiates a region corresponding to the image capture area data in the object with character information when the image capture unit generates the image data, and
   the character information indicates illumination parameters used for controlling the illumination unit.

8. The image capture device according to claim 1, wherein the mark irradiation unit irradiates a region corresponding to the image capture area data in the object with character information when the image capture unit generates the image data.

9. An image processing method, comprising:
   capturing, by an image capture unit, an image of an object and generating image data in a state in which the object is irradiated with a mark by a mark irradiation unit;
   recognizing a position of the mark in the image data and cutting out image capture area data which is a part of the image data on the basis of the mark by using a computer;
   controlling an irradiation angle of the mark by using a direction of the object when based on the capturing, and a distance from the object to the image capture unit, wherein a holding member holds the image capture unit, a guide member is attached to the holding member to be movable and rotatable, and a pedestal is attached to the guide member;
   detecting an angle of the holding member with respect to the guide member; and
   detecting a position of the holding member in the guide member,
   wherein the direction of the object, when based on the image capture unit, is calculated by using a detection result of the detecting the angle, and a distance of the image capture unit with respect to the object is calculated by using a detection result of the detecting the position, and
   wherein the position of the mark in the image data is calculated based on a field angle of the image capture unit, an irradiation direction of the mark irradiation unit, and a distance from the object to the image capture unit and the mark irradiation unit.

* * * * *